(12) United States Patent
Scott et al.

(10) Patent No.: US 7,776,943 B2
(45) Date of Patent: Aug. 17, 2010

(54) METHOD FOR FORMING EXFOLIATED CLAY-POLYOLEFIN NANOCOMPOSITES

(75) Inventors: Susannah Scott, Goleta, CA (US); Brian Peoples, Goleta, CA (US); Rene' Rojas, Santiago (CL); Akio Tanna, Kawasaki (JP); Fumihiko Shimizu, Hachioji (JP)

(73) Assignee: The Regents of the University of California, Oakland, CA (US)

( * ) Notice: Subject to any disclaimer, the term of this patent is extended or adjusted under 35 U.S.C. 154(b) by 997 days.

(21) Appl. No.: 11/451,199

(22) Filed: Jun. 12, 2006

(65) Prior Publication Data

US 2008/0275164 A1 Nov. 6, 2008

(51) Int. Cl.
*C08K 3/36* (2006.01)
*C08J 3/22* (2006.01)

(52) U.S. Cl. .................. 523/351; 524/445; 524/570
(58) Field of Classification Search ............... 523/351; 524/445, 570
See application file for complete search history.

(56) References Cited

U.S. PATENT DOCUMENTS

| 4,785,044 | A | 11/1988 | Kannankeril |
| 5,308,811 | A | 5/1994 | Suga et al. |
| 6,451,728 | B1 | 9/2002 | Matsui et al. |
| 6,500,892 | B1 | 12/2002 | Bishop et al. |
| 6,646,072 | B2 | 11/2003 | Klendworth et al. |
| 2004/0171479 | A1 | 9/2004 | Bazan et al. |
| 2004/0266934 | A1 | 12/2004 | Klendworth et al. |
| 2006/0122308 | A1 | 6/2006 | Wermter et al. |
| 2007/0185343 | A1 | 8/2007 | Verpoort et al. |

FOREIGN PATENT DOCUMENTS

| WO | WO 99/47598 |   | 9/1999 |
| WO | WO 00/69959 | * | 11/2000 |
| WO | WO 01/30864 |   | 5/2001 |
| WO | WO 01/30864 A2 |   | 5/2001 |

OTHER PUBLICATIONS

T.G. Gopakumar, J.A. Lee, M. Kontopoulou and J.S. Parent, *Influence of clay exfoliation on the physical properties of montmorillonite/polyethylene composites*, Polymer 43 (2002) 5483-5491.

S.S. Ray and M. Okamoto, *Polymer/layered silicate nanocomposites: a review from preparation to processing*, Prog. Polym. Sci. 28 (2003) 1539-1641.

K. Weiss, C. Wirth-Pfeifer, M. Hofmann, S. Botzenhardt, H. Lang, K. Bruning and E. Meichel, *Polymerisation of ethylene or propylene with heterogeneous metallocene catalyst on clay minerals*, J. Mol. Catal. A: Chem. 182/183 (2002) 143-149.

E.G. Howard, R.D. Lipscomb, R.N. MacDonald, B.L. Glazar, C.W. Tullock and J.W. Collette, *Homogeneous Composites of Ultrahigh Molecular Weight Polyethylene and Minerals. 1. Synthesis*, Ind. Eng. Chem. Prod. Res. Dev. 20 (1981) 421-428.

G.G. Hlatky, *Heterogeneous Single-Site Catalysts for Olefin Polymerization*, Chem. Rev. 1000 (2000) 1347-1376.

J. Tudor, L. Willington, D. O'Hare and B. Royan, *Intercalation of catalytically active metal complexes in phyllosilicates and their application as propene polymerisation catalysts*, Chem. Commun. (1996) 2031-2032.

Y. Suga, Y. Maruyama, E. Isobe, T. Suzuki and F. Shimizu, *Catalysts for Polymerizing an Olefin and Method for Producing an Olefin Polymer*, US Patent 5,308,811 (1994).

Y. Ishihama, E. Isobe, Y. Maruyama, T. Sagae, Y. Suga and Y. Uehara, *Catalyst for polymerizing an olefin and method for polymerizing the olefin*, EP Patent 0683180 (1995).

T. Sun and J.M. Garces, *High-Performance Polypropylene-clay Nanocomposites by In-situ Polymerization with Metallocene/Clay Catalysts*, Adv. Mater. 14 (2002) 128-130.

J.S. Bergman, H. Chen, E.P. Giannelis, M.G. Thomas and G.W. Coates, *Synthesis and characterization of polyolefin-silicate nanocomposites: a catalyst intercalation and in situ polymerization approach*, Chem. Commun. (1999) 2179-2180.

Y.-H. Jin, H.-J. Park, S.-S. Im, S.-Y. Kwak and S. Kwak, *Polyethylene/Clay Nanocomposite by In-Situ Exfoliation of Montmorillonite During Ziegler-Natta Polymerization of Ethylene*, Macromol. Rapid Commun. 23 (2002) 135-140.

T. Tang, L. Wei and B. Huang, *Process for Preparation of Polyolefin/Inorganic Component Nanocomposite by In-situ Polymerization*, Patent US 6,649,713 (2003).

J. Heinemann, P. Reichart, R. Thomann and R. Mulhaupt, *Polyolefin nanocomposites formed by melt compounding and transition metal catalyzed ethane homo-and copolymerization in the presence of layered silicates*, Macromol. Rapid Commun. 20 (1999) 423-430.

P. Dubois, M. Alexandre and R. Jerome, *Polymerization-Filled Composites and Nanocomposites by Coordination Catalysis*, Macromol. Symp. 194 (2003) 13-26.

(Continued)

Primary Examiner—Robert D. Harlan
(74) Attorney, Agent, or Firm—Berliner & Associates

(57) ABSTRACT

A method for forming a nanocomposite by olefin polymerization in which at least one cation-exchanging layered load material, selected from the group consisting of cation-exchanging, layered inorganic silicates and cation-exchanging, layered compounds other than silicates, is treated with acid to disrupt its layered structure and is combined with a catalyst that becomes activated for olefin polymerization when in contact with the acid-treated filler. An olefin is contacted by the activated catalyst—filler combination either (a) in the absence of an alkylaluminum co-catalyst or (b) with an alkylaluminum co-catalyst when the activatable catalyst is a polyalkylmetal compound, to form a nanocomposite containing polyolefin and the acid-treated filler. In a particular embodiment, sufficient filler is used to constitute at least 30 weight % of the nanocomposite to prepare a highly loaded nanocomposite masterbatch. A predetermined amount of one or more olefinic polymers can then be blended with the masterbatch to obtain a nanocomposite having a desired amount of loading. The filler is preferably clay, exemplified by montmorillonite. The catalyst is preferably a non-metallocene catalyst, most preferably a nickel complex bearing an α-iminocarboxamidato ligand.

25 Claims, 2 Drawing Sheets

OTHER PUBLICATIONS

H.G. Jeon, H.-T. Jung, S.W. Lee and S.D. Hudson, *Morphology of polymer/silicate nanocomposites*, Polymer Bull. 41 (1998) 107-113.

A. Usuki, M. Kato, A. Okada and T. Kurauchi, *Synthesis of Polypropylene-Clay Hybrid*, J. Appl. Polym. Sci. 63 (1997) 137-139.

M. Kawasumi, N. Hasegawa, M. Kato, A. Usuki and A. Okada, *Preparation and Mechanical Properties of Polypropylene-Clay Hybrids*, Macromolecules 30 (1997) 6333-6338.

N. Hasegawa, M. Kawasumi, M. Kato, A. Usuki and A. Okada, *Preparation and Mechanical Properties of Polypropylene-Clay Hybrids using a Maleic Anhydride-Modified Polypropylene Oligomer*, J. Appl. Polym. Sci. 67 (1998) 87-92.

D. Kaempfer, R. Thomann and R. Mulhaupt, *Melt compounding of syndiotactic polypropylene nanocomposites containing organophilic layered silicates and in situ formed core/shell nanoparticles*, Polymer 43 (2002) 2909-2916.

P.H. Nam, P. Maiti, M. Okamoto, T. Kotaka, N. Hasegawa and A. Usuki, *A hierarchical structure and properties of intercalated polypropylene/clay nanocomposites*, Polymer 42 (2001) 9633-9640.

K.H. Wang, M.H. Choi, C.M. Koo, Y.S. Choi and I.J. Chung, *Synthesis and characterization of maleated polyethylene/clay nanocomposites*, Polymer 42 (2001) 9819-9826.

N. Hasegawa, M. Okamoto, M. Kawasumi, M. Kato, A. Tsukigase and A. Usuki, *Polyolefin-clay hybrids based on modified polyolefins and organophilic clay*, Macromol. Mater. Eng. 280/281 (2000) 76-79.

E. Manias, A. Touny, L. Wu, K. Strawhecker, B. Lu and T.C. Chung, *Polypropylene/Montmorillonite nanocomposites. Review of the Synthetic routes and Materials Properties*, Chem. Mater. 13 (2001) 3516-3523.

M.-S. Hsiao, G.-Y. Chang, S.-Y. Lee and S.-J. Jong, *Polyolefin-Based Nanocomposite and Preparation Thereof*, U.S. Patent 6,838,508 (2005).

Z.M. Wang, H. Nakajima, E. Manias and T.C. Chung, Exfoliated PP/Clay Nanocompsoites Using Ammonium-Terminated PP as the Organic Modification for Monmorillonite, Macromolecules 36 (2003) 8919-8922.

S.-S. Hou and K. Schmidt-Rohr, Polymer-Clay Nanocomposites from Directly Micellized Polymer/Toluene in Water and Their Characterization by WAXD and Solid-'State NMR Spectroscopy, Chem. Mater. 15 (2003) 1938-1940.

B.Y. Lee, G.C. Bazan, J. Vela, Z.J.A. Komon and X. Bu, α-Iminocarboxamidato-Nickel (II) Ethylene Polymerization Catalysts, J. Am. Chem. Soc. 123 (2001) 5323-5353.

\* cited by examiner

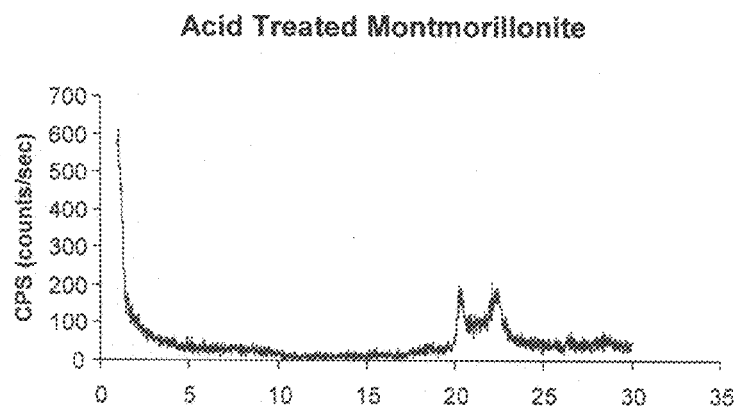
Fig. 1: Powder XRD
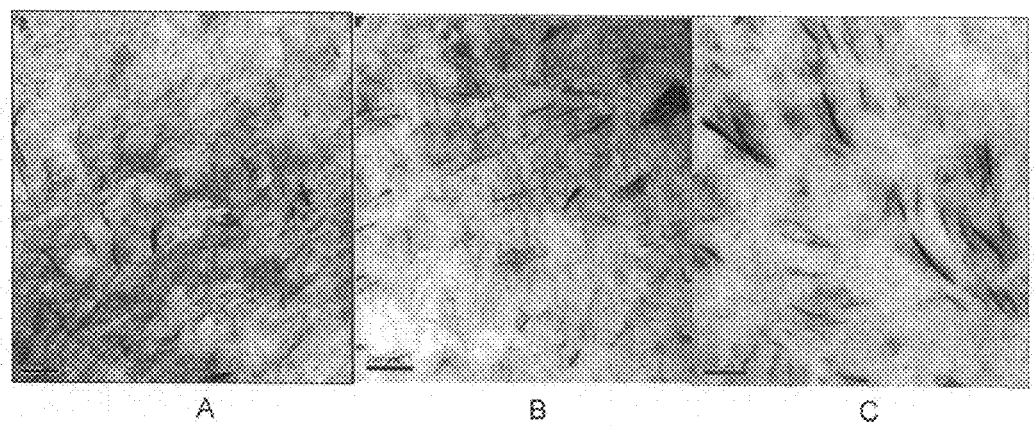
Fig. 2: TEM (all scale markers 200 nm)

METHOD FOR FORMING EXFOLIATED CLAY-POLYOLEFIN NANOCOMPOSITES

BACKGROUND OF THE INVENTION

1. Field of Invention

The invention relates to the formation of exfoliated clay-polyolefin nanocomposites.

2. Related Art

Nanocomposites are materials containing two or more chemically dissimilar phases in which at least one of the phases has a nanoscale dimension. Nanocomposites consisting of exfoliated clay lamellae dispersed in an organic polymer matrix exhibit enhanced physical properties relative to virgin polymer, or to conventional macro- or microcomposites containing other inorganic fillers (e.g., glass fiber, talc, mica, carbon black) [1]. The enhancements include improved tensile and flexural properties, increased storage modulus, increased heat distortion temperature, decreased flammability, decreased gas permeability, reduced visual defects and improved optical transparency [2].

The clay filler achieves these improvements at very low clay loadings ($\leq 5$ wt %), thus the material retains desirable polymer properties such as light weight, low cost, solution/melt processability and recyclability. Uses for these nanocomposite materials include molded automotive and appliance components (such as body panels, under hood components, electrical/electronic parts and insulation, power tool housings) and furniture (such as seat components, consoles), medical tubing, abrasion and chemical resistant coatings, food packaging materials (such as transparent stretch films) and barrier layers for beverage bottles.

Clays such as kaolinite, hectorite and montmorillonite (MMT) have been investigated as mechanical supports for single-site ethylene polymerization catalysts [3]. Usually the support is also treated with an organoaluminum co-catalyst, such as a trialkylaluminum or an alkylaluminoxane, which serves to remove adsorbed water and passivate the clay surface. It has also been suggested that alkylaluminum compounds can cause delamination of kaolinite. In general, the catalyst is adsorbed onto the co-catalyst-modified clay, where it is activated in situ by the co-catalyst surface layer [5], [6]. Olefin uptake by the supported catalyst results in controlled particle growth, which is a desirable behavior in polymerization reactor engineering.

Supporting metallocene catalysts on clays results in modest activity for ethylene polymerization [7], even in the absence of alkylaluminum co-catalysts[8]. However these catalyst systems do not generate high quality nanocomposites; the polyethylene they produce contains small clumps of unexfoliated clay.

The desirable physical properties of nanocomposites are observed only when clay sheets (of thickness ca. 1 nm, with aspect ratios up to $10^2$ are highly dispersed in the polyolefin matrix. Physical mixtures of clay and polymer do not show enhanced properties, while intercalated nanocomposites (in which polymer chains are inserted between parallel clay sheets) have properties resembling those of ceramics. The difficulty in making exfoliated clay-polyolefin nanocomposites originates in the immiscibility of strongly associated hydrophilic clay sheets and hydrophobic polyolefin chains. Clay layers are negatively charged due to isomorphic substitution of framework ions, generally cations. Interlayer cations provide charge compensation and promote strong interlayer adhesion, which simple mixing with a polyolefin cannot effectively disrupt.

One strategy to make the components of the nanocomposite compatible is to render the clay hydrophobic, by replacing the interlayer ions with surfactants such as long chain alkylammonium, imidazolium or alkylphosphonium cations (typically C18). This procedure generates an organically-modified layered silicate (OMLS). Methods employing an OMLS in the preparation of polyolefin nanocomposites include:

In situ intercalative polymerization, in which a catalyst adsorbed onto the OMLS, causes spontaneous delamination upon addition of monomer. This strategy has been successfully applied to propylene polymerization using a zirconocene catalyst supported on methylaluminoxane (MAO)-treated OMLS [9], and to ethylene polymerization using a Brookhart Pd catalyst supported on OMLS [10]. The Ziegler catalyst $TiCl_4$, grafted onto a hydroxyl-containing surfactant intercalated into MMT, was used for in situ polymerization of ethylene upon activation with triethylaluminum. [11]. Silica or titania nanoparticles synthesized in the interlayer spaces of an OMLS by a sol-gel method were treated with an alkylaluminum and a metallocene to create a catalyst system for in situ polymerization [12]. In situ polymerization filling was achieved using MAO-treated clay and metallocene or constrained geometry catalysts with [13] and even without [14], [15] surfactant modification of the clay. In the absence of surfactant, the clay was swollen using an organic solvent.

Solution intercalation, in which high density polyethylene (HDPE) dissolved in a hot xylene/benzonitrile mixture is stirred with dispersed OMLS [16];

Melt intercalation, in which the OMLS is annealed with polymer above the softening point of the latter, either statically or under shear. Since mixing is driven by interactions between the polymer and the clay, this method typically requires a compatibilizer consisting of polymers or oligomers modified with polar sidechains or endgroups. For example, nanocomposite formation was achieved by melt intercalation of propylene oligomers with telechelic OH groups, followed by melt-mixing with unmodified PP [17]. Melt blending of PP and OMLS was achieved using a twin screw extruder in the presence of maleated PP (i.e., functionalized with maleic anhydride side chains, PP-g-MA) as the compatibilizer [18]-[21]. A similar strategy was used to make nanocomposites by melt blending of PE-g-MA [22], [23], or EPR-g-MA [23] with OMLS. A semifluorinated surfactant was used to create an OMLS with weaker clay-surfactant interactions and a greater propensity to intercalate unmodified PP[24]. A method involving functionalized surfactants which react to form chemical bonds with the maleated compatibilizer has been described [25]. Direct melt intercalation of ammonium-functionalized polypropylene chains into unmodified MMT was achieved, presumably by direct cation exchange, without intermediate functionalization of the clay with surfactant [26].

Recently, the formation of nanocomposites with unmodified clay was achieved by making the polyolefin component more hydrophilic. In the presence of the surfactant cetyltrimethylammonium bromide, micelles containing styrene were formed and adsorbed from solution onto dispersed clay [27].

Also recently, nanocomposite materials have been produced by adding an olefin to a suspension of acid-treated cation-exchanging layered silicate treated with a solution of a metallocene polymerization catalyst, causing olefin polymerization to form the nanocomposite polymer [28]. Although described in broad encompassing terms, the specific preparations described by the reference all require the use of a tripropylaluminum co-catalyst added to the slurry formed by mixing 4-tetradecylanilinium-exchanged or HCl-treated clay to dry toluene.

SUMMARY

The present invention provides a method for forming a nanocomposite material with a high dispersion of exfoliated platelets of an otherwise layered cation exchanging filler, without the use of alkylammonium modifiers to separate the filler layers, and which in preferred embodiments is accomplished without the use of an alkylaluminum co-catalyst. In other embodiments, an alkylaluminum co-catalyst can be used but with a polyalkylmetal compound as catalyst The layered filler is selected from the group consisting of cation-exchanging, layered inorganic silicates and cation-exchanging, layered compounds other than silicates. The invention proceeds by combining the filler with a catalyst that becomes activated for olefin polymerization when in contact with the filler. An olefin is contacted by the activated catalyst—filler combination in the absence of an alkylaluminum co-catalyst to form a nanocomposite polymer containing the filler. The catalyst can be selected to provide a high or low melting point polymer. One class of preferred catalysts used particularly without the need or use of an alkylaluminum co-catalyst is a non-metallocene catalyst, most preferably a nickel complex bearing an α-iminocarboxamidato ligand. Another preferred catalyst, one that can be used with or without an alkylaluminum co-catalyst, is tetrabenzylzirconium.

In a particular embodiment, sufficient layered cation-exchanging silicate is used to constitute at least 30 weight % of the nanocomposite material to prepare a high silicate-loaded nanocomposite masterbatch. A predetermined amount of one or more polyolefins can then be blended with the masterbatch to obtain a nanocomposite polymer having a desired amount of silicate loading.

In specific embodiments, the silicate material is a cation-exchanging clay. In a more specific embodiment, the invention achieves high dispersion of montmorillonite clay platelets in a polyethylene or polypropylene matrix by in situ polymerization of ethylene or propylene. As above, the clay is first acid-treated, causing disruption of its layered structure. The acid-treated clay is then treated with an organic solvent solution of a polymerization catalyst, which contains Ni, an α-iminocarboxamidato ligand and an alkyl ligand. Upon exposure to olefin, a polyolefin matrix is formed in which the embedded clay layers are mostly separated.

The invention represents a simple, inexpensive, one-pot procedure for making silicate-polymer nanocomposites without the need for time-consuming organic modification of the filler material or the use of expensive surfactants. The use of organic solvents to swell the clay and/or dissolve the polymer is greatly reduced or eliminated. There is no need for compatibilizers, such as maleated polymers, whose lower molecular weights and lower stability relative to the polyolefin component may result in degradation of nanocomposite performance [1]. There is no need for organoaluminum activators or other cocatalyst modification or passivation of the surface of the load material, since the load material itself serves as catalyst activator. These improvements lead to higher quality and less expensive nanocomposite polymers.

BRIEF DESCRIPTION OF DRAWINGS

FIG. 1 shows an X-ray diffraction pattern of acid-treated montmorillonite; and

FIG. 2 shows TEMs of polyethylene-clay nanocomposites with (A) 3 wt. % clay, (B) 11 wt. % clay, and (C) ethylene/1-hexene copolymer with 3 wt. % clay.

DETAILED DESCRIPTION OF THE INVENTION

Figure 3:
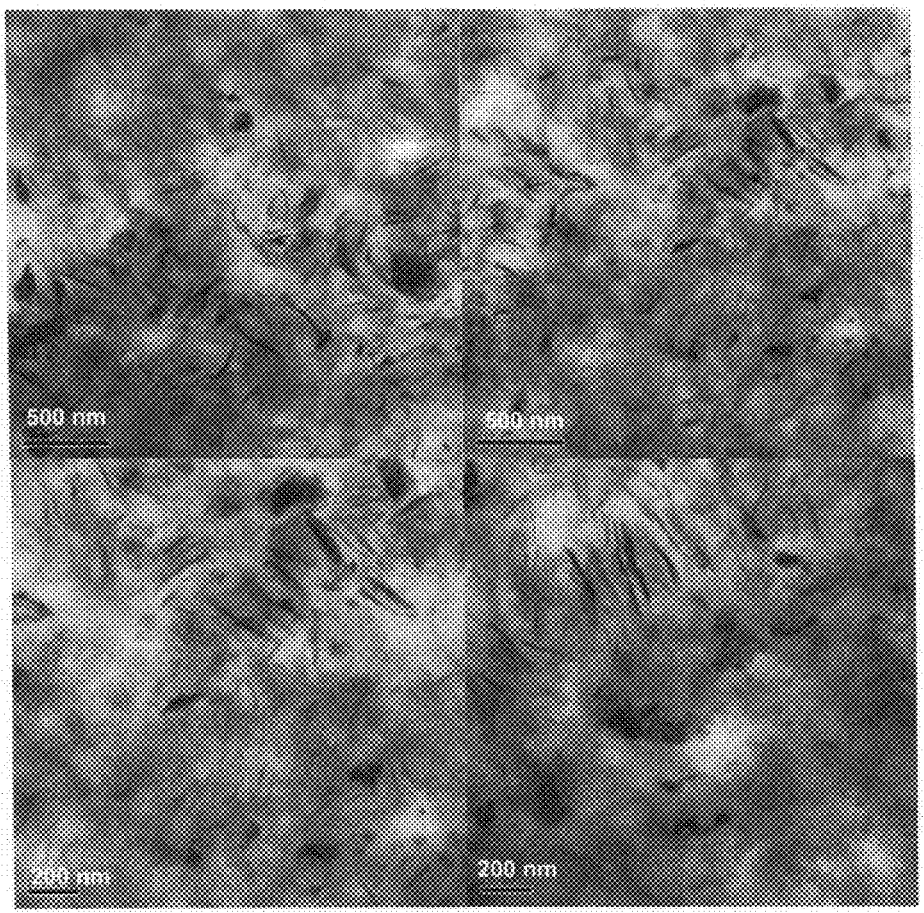
FIG. 3 shows TEM images of an 11.1 wt % clay-polyethylene composite produced with a trimethylaluminum-modified clay catalyst.

The invention provides a method for forming an exfoliated clay-polyolefin nanocomposite by olefin polymerization in the presence of a cation-exchanging, layered load material pre-treated with acid to disrupt its layered structure. The filler is selected from the group consisting of cation-exchanging, layered inorganic silicates and cation-exchanging, layered compounds other than silicates, and is combined with a catalyst that becomes activated for olefin polymerization when in contact with the acid-treated filler. The activated catalyst—filler combination is then contacted with olefin whereby to form a polyolefin nanocomposite material incorporating exfoliated platelets of the filler. In preferred embodiments, the polymerization step can be accomplished without the use of an alkylaluminum co-catalyst. In other embodiments, an alkylaluminum co-catalyst may be used but with a polyalkylmetal compound as catalyst.

More particularly, the acid-treated filler and catalyst are added to a reactor followed by the addition to the reactor of the olefin. As stated above, in an advantageous departure from the art, the polymerization reaction can be carried out in the absence of an alkylaluminum co-catalyst. This allows significant savings and simplification of the process. Indeed, in one of the preferred embodiments, where the catalyst is a nickel complex bearing an α-iminocarboxamidato ligand, when trimethylaluminum is added as a scavenger to the reactor after addition of the filler and catalyst, an excess of trimethylaluminum (60-fold relative to catalyst) causes reactor fouling. A large excess of trimethylaluminum (350-fold relative to catalyst) inhibits the polymerization. When added to the clay prior to the addition of catalyst, incorporation of the clay into the polymer matrix is compromised, and material is obtained is not a highly exfoliated nanocomposite.

In particular embodiments, sufficient cation-exchanging load material is used to constitute at least 30 weight % of the nanocomposite material, to prepare a high loaded nanocomposite masterbatch. A predetermined amount of one or more olefinic polymers can be blended with the masterbatch to obtain a nanocomposite having a desired amount of loading.

As the cation-exchanging load material, clay, clay minerals or cation exchanging compounds having a layered crystal structure of e.g. a hexagonal densely packed-type, antimony-type, $CdCl_2$-type or $CdI_2$-type, may be used. Specific examples of clay, clay minerals and cation-exchanging layered compounds useful as fillers include kaolin, bentonite, kibushi clay, gairome clay, allophane, hisingerite, pyrophyllite, talc, a mica group, a montmorillonite group, vermiculite, a chlorite group, palygorskite, kaolinite, nacrite, dickite and halloysite. The silicates to be used as a filler in the present invention may be synthesized products or naturally produced minerals. Further, other than the acid treatment used in this invention, they may be used as they are without subjecting them to any other treatment, or they may be treated by ball milling, sieving, acid treatment or the like before use. Further, they may be treated to have water added and adsorbed or may be dehydrated by heating before use. They may be used alone or in combination as a mixture of two or more of them.

Specific examples of the silicates include lithium silicate, sodium silicate, potassium silicate, magnesium silicate, calcium silicate, barium silicate, aluminium silicate, titanium silicate and zirconium silicate, an olivaine group such as olivine and fayalite, a garnet group such as garnet, a phenacite group such as phenacite and willemite, zircon, tricalcium silicate, merrillite, gehlenite, benitoite, beryl, cordierite, a pyroxene group such as enstatite, hypersthene, diopside, spondumene, rhodonite and wollastonite, an amphibole group such as anthophyllite, tremolite and actinolite.

Particularly preferred as fillers are clay or clay minerals, and most preferred is montmorillonite.

The cation-exchanging layered filler material is acidified by contacting it with a Brønsted acid (such as hydrochloric acid, sulfuric acid, or any material which forms a strong acidic aqueous solution. The acid dissolves some of the aluminum present in the clay and thereby partly disrupts the layered structure.

The acid-treated filler is dispersed with a small quantity of solvent (such as toluene), which can be done by any suitable technique, and can use mechanical means if desired or needed such as by sonication or by high shear mixing or wet ball milling.

As indicated, the catalyst is preferably a non-metallocene catalyst. In a particularly preferable embodiment, the catalyst is a nickel complex bearing an α-iminocarboxamidato ligand. The acid-treated clay activates late transition metal catalysts containing α-iminocarboxamidato ligands, i.e., catalysts from the family LNi(R)(S), where L is an α-iminocarboxamidato ligand, R is an alkyl group (e.g., $CH_2Ph$) and S is an ancillary ligand (e.g., $PMe_3$) [28].

Most preferably, the nickel catalyst is a complex having the general formula I, II, III, IV or V:

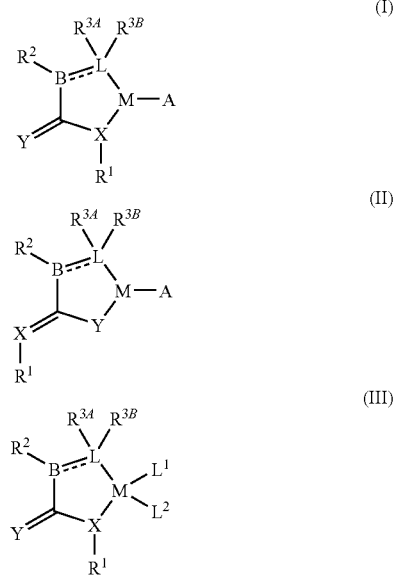

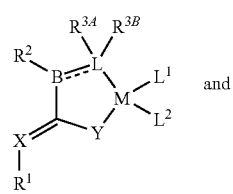

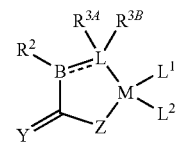

wherein:

M is Ni, Pt, Pd;

A is a π-allyl, a substituted π-allyl, a π-benzyl, a substituted π-benzyl, benzoyl or picolino ligand;

X is N, P or CH;

Y is O, $CH_2$, or S;

Z═O or S

L is N or P or a structure that is capable of being a neutral two electron donor ligand;

$L^1$ is a neutral monodentate ligand and $L^2$ is a monoanionic monodentate ligand, or $L^1$ and $L^2$ taken together are a monoanionic bidentate ligand, provided that said monoanionic monodentate ligand or said monoanionic bidentate ligand is capable of adding to said olefin;

B is a bridge connecting covalently an unsaturated carbon and L;

$R^1$, $R^2$, $R^{3A}$ and $R^{3B}$ are the same or different and are each independently hydrogen, hydrocarbyl group, or substituted hydrocarbyl bearing functional group; the designation:═══ is a single or double bond; and $R^{3B}$ is nothing when B is connected to L by a double bond.

A particularly preferred catalyst is (N-(2,6-diisopropylphenyl)-2-(2,6-diisopropylphenylimino)propanamidato)Ni ($\eta^3$-$CH_2Ph$).

With the nickel complex catalyst, no additional cocatalyst is required to achieve typical polymerization activities of 1000 kg polyethylene/mol catalyst/hr at 30° C. The clay does not need to be dried, although better activities are obtained with clay dried in vacuo for 12 hours at 100° C. In a typical procedure, a solution of 8 μmol of the catalyst in toluene or hexane is stirred with 85 mg of dried clay under a $N_2$ atmosphere. This catalyst suspension can be loaded directly into the reactor, or filtered, washed and resuspended in fresh, dry solvent prior to use.

An alkylaluminum co-catalyst can be advantageously used with polyalkylmetal compounds that are active in olefin polymerization when supported on clay. The metal component can be any early transition metal, such as titanium, zirconium, hafnium, vanadium, niobium, tantalum, chromium, molybdenum, tungsten. Any of a variety of alkyl or substituted alkyl ligands can be used, particularly those which lack alpha-hydrogens, such as neopentyl, neosilyl, benzyl, adamantyl, which are stable in the form MRx (where M is the metal. R is the alkyl ligand, and x is the number of alkyl ligands (from 3 to 6, usually 4).

When an olefin is contacted with the activated catalyst—filler combination, the olefin polymerizes to form an exfoliated nanocomposite material containing platelets of the acid-treated filler dispersed in the polyolefin matrix. It is believed that Lewis acid sites on the acid-treated layered filler activate the catalyst to produce polymer between the layers of the layered load material and thereby separate or exfoliate such layers to a greater degree into the developing polymer matrix.

Preferably, the olefin used in the instant invention is selected from the group of olefins having from two to ten carbon atoms. Such olefins include, for example, styrene, divinylbenzene, norbornene, ethylene, propylene, hexene, octene, butadiene and mixtures thereof. Thus, the polymer product of or by way of the instant invention may be, for example, a polyethylene, a polypropylene, a thermoplastic elastomer, or a synthetic rubber. It is also possible that larger monomers (macromonomers) are formed in situ and incorporated into the polymer.

In a preferred embodiment, the olefin is ethylene or propylene. In another preferred embodiment, the olefin is a combination of ethylene and an α-olefin, e.g., 1-hexene.

Preferably, the weight % of acid-treated cation-exchanging layered filler in the nanocomposite material is at least 0.5%. In a preferred embodiment, sufficient silicate is used to constitute at least 30 weight % of the nanocomposite to prepare a highly silicate-loaded nanocomposite masterbatch. A predetermined amount of one or more olefinic polymers can be blended with the nanocomposite masterbatch to obtain a nanocomposite material having a desired amount of silicate loading, e.g., from 0.1 to 20 weight %.

In a particularly preferred embodiment, a nanocomposite polyethylene is formed by treating montmorillonite with acid to disrupt its layered structure, combining the acid-treated montmorillonite with an (α-iminocarboxamidato)nickel catalyst that becomes activated for ethylene polymerization when in contact with the acid-treated montmorillonite, and contacting ethylene with the activated catalyst—montmorillonite combination, in the absence of an alkylaluminum co-catalyst, whereby to form a polyethylene nanocomposite containing the acid-treated montmorillonite. In a particularly preferred embodiment, the α-iminocarboxamidato catalyst is (N-(2,6-diisopropylphenyl)-2-(2,6-diisopropylphenylimino)propanamidato)Ni($\eta^3$-CH$_2$Ph).

Polymerization of ethylene or copolymerization of ethylene with an α-olefin such as 1-hexene occurs at temperatures from 10 to 70° C., preferably between 20 and 50° C. Since the polymerization is highly exothermic, it is desirable to control the temperature with a heat exchanger to prevent overheating and decomposition of the catalyst above 70° C. The polymerization can be terminated by exhaustion of monomer, by venting unreacted monomer, or by quenching the reaction with a chain-terminating agent, such as hydrogen gas, carbon monoxide or a polar comonomer.

The following examples will illustrate best practices of the invention.

EXAMPLE 1

Acid-treated lithium montmorillonite was prepared by stirring a suspension of untreated clay in a solution of Li$_2$SO$_4$ and concentrated H$_2$SO$_4$ for 5 hours. This material retains its sheet-like structure but the interlayer association is greatly disrupted, as shown by the absence of an XRD (001) reflection at 2θ=7°, as shown in FIG. 1.

85 mg Acid-treated lithium montmorillonite was partially dehydrated by heating at 100° C. under a dynamic vacuum (12 hours at $\leq 10^{-4}$ Torr) and then transferred to a N$_2$-filled glove box. A dark orange solution of the air-sensitive catalyst, LNi($\eta^3$-CH$_2$Ph) where L=N-(2,6-diisopropylphenyl)-2-(2,6-diisopropylphenylimino)propanamidato (4 mg in 1 g toluene) was mixed with a slurry of 85 mg clay suspended in 26 g toluene for 30 mins at room temperature inside a batch polymerization reactor thermostated at 25° C. The reactor was pressurized with 689 kPa C$_2$H$_4$ and polymerization proceeded for 70 mins. The reaction yielded 3.2 g of polyethylene with M$_W$=1,089,000 g/mol, a polydispersity index of 2.8 and a clay content of 2.6 wt %.

Evidence for nanocomposite formation is shown in the transmission electron microscopy (TEM) image of FIG. 2A. Individual clay sheets are visible in profile as dark lines against the light gray polyethylene background.

EXAMPLE 2

The procedure of Example 1 was repeated except that 500 mg acid-treated lithium montmorillonite was used. The result was a yield of 4.7 g of polyethylene M$_W$=1,146,000 g/mol, a polydispersity index of 2.7 and a clay content of 10.6 wt %. Evidence for nanocomposite formation is shown in the transmission electron microscopy (TEM) image of FIG. 2B.

EXAMPLE 3

The procedure of Example 1 was repeated except that 4 g of the solvent, toluene, was replaced with 4 g of 1-hexene, and polymerization proceeded for 30 mins. The reaction yielded 3.6 g of polyethylene with a clay content of 2.4 wt %. Evidence for nanocomposite formation is shown in the transmission electron microscopy (TEM) image of FIG. 2C.

The images of FIG. 2 show that most of the clay is exfoliated. Groups of less than 5 associated, possibly intercalated, clay sheets are also present. High clay dispersion was observed up to 11 wt % loading, and in the presence of co-monomer.

EXAMPLE 4

The clay can be cation-exchanged with cations other than Li. Thus, the procedure of Example 1 can be repeated except that the clay is cation-exchanged with Na.

EXAMPLE 5

The acid treatment can be applied to clays other than montmorillonite, or to cation exchanging layered non-clay materials. Thus, the procedure of Example 1 can be repeated except that the acid treatment can be applied to layered aluminum phosphate.

EXAMPLE 6

In manner similar to Example 5, the procedure of Example 1 can be repeated except that the acid treatment can be applied to zirconium phosphate.

EXAMPLE 7

The structure of the catalyst can be varied via the nature of the donor atoms and the substituents on the ligand L, the initiating group R and the ancillary ligand S. Thus, the procedure of Example 1 can be repeated except that the late transition metal Pd may be substituted for the late transition metal Ni.

EXAMPLE 8

In manner similar to Example 7, the procedure of Example 1 can be repeated except that the late transition metal Pt may be substituted for the late transition metal Ni.

EXAMPLE 9

In manner similar to Example 7, the procedure of Example 1 can be repeated except that the late transition metal Fe may be substituted for the late transition metal Ni.

EXAMPLE 10

In manner similar to Example 7, the procedure of Example 1 can be repeated except that the late transition metal Co may be substituted for the late transition metal Ni.

EXAMPLE 11

The method can be used for nanocomposites of homopolymers other than polyethylene. Thus, the procedure of Example 1 was repeated except that the olefin was propylene and the catalyst was $LNi(\eta^1-CH_2Ph)(PMe_3)$ where L=2-methylene-3-(2,6-diisopropylphenylimino)propoxide. A mixture of the catalyst (8 mg in 1 g toluene) and bis(1,5-cyclooctadiene)nickel (30 mg in 2 g toluene) was added to a slurry of 450 mg clay suspended in 55 g toluene. The reactor was pressurized with 937 kPa $C_3H_6$ and the polymerization proceeded for 180 mins. The reaction yielded 1.4 g of a polypropylene nanocomposite with a clay loading of 32%.

EXAMPLE 12

The method can be used for nanocomposites of copolymers of ethylene with other α-olefins or with functionalized monomers. Thus, the procedure of Example 1 can be repeated except that the olefin is styrene.

EXAMPLE 13

In manner similar to Example 12, the procedure of Example 1 can be repeated except that the olefin is norbornene.

EXAMPLE 14

The ethylene pressure can be varied in order to alter the branch content of the polymer. Thus, the procedure of Example 1 can be repeated except that the ethylene pressure is increased to 3500 kPa.

EXAMPLE 15

The procedure of Example 1 can be used to make a masterbatch with high clay loading which then can be blended with pure polymer (polyethylene, polypropylene, copolymers of ethylene with other alpha-olefins, etc) to create nanocomposites with the desired clay loading. Thus, the procedure of Example 1 can be repeated except that a slurry of 0.25 g clay suspended in 40 g toluene can be treated with 1 mg of the catalyst of Example 1 (in 1 g toluene). The reactor can be pressurized with 689 kPa $C_2H_4$ and polymerization can proceed for 4 mins, to yield polyethylene having a clay content of at least 40 wt. %.

EXAMPLE 16

The procedure of the present invention does not require the use of alkylaluminum activators. The following experiment demonstrates the superiority of the materials obtained in the absence of alkylaluminum by comparing nanocomposites prepared in the presence of trimethylaluminum (TMA).

500 mg neat TMA was added dropwise to a rapidly stirred suspension of 3 g acid-treated montmorillonite in 10 g toluene. The clay was then filtered and washed three times with fresh toluene to remove unreacted TMA. A portion of the clay (626 mg) was resuspended in 70 g toluene and transferred to a 300 mL Parr reactor. 1 g of catalyst solution (16 mg LNi($\eta^3$-CH$_2$Ph) catalyst where L=N-(2,6-diisopropylphenyl)-2-(2,6-diisopropylphenylimino)propanamidato in 3 g toluene) was added, the reactor was sealed and removed from the glove box. After thermal equilibration at 40° C. with stirring, ethylene was added on demand at 100 psi for 35 minutes. The activity is similar to that of the catalyst supported on unmodified clay, under similar conditions in the same reactor. 5.6 g of material (containing 11.1 wt % clay) was recovered. It appeared fluffier (i.e., less granular) than materials previously produced using clay without TMA modification.

FIG. 3 shows TEM images of an 11.1 wt % clay-polyethylene composite produced with TMA-modified clay catalyst. While the clay is well-distributed in the polymer matrix, it is not highly exfoliated. This may be a consequence of TMA-induced catalyst leaching, resulting in polymerization other both on and off the surface of the clay. The fluffy polymer morphology is consistent with this explanation, since it resembles materials produced by homogeneous acid-activated catalysts.

EXAMPLE 17

31.1 g Acid-treated lithium montmorillonite was partially dehydrated by heating at 200° C. under a dynamic vacuum (12 hours at $\leq 10^{-4}$ Torr). The clay was then suspended in toluene (100 g) and transferred, under N$_2$, to a 2 L autoclave reactor containing 1 L toluene. A solution of the catalyst, LNi($\eta^3$-CH$_2$Ph) where L=N-(2,6-diisopropylphenyl)-2-(2,6-diisopropylphenylimino)propanamidato (16 mg in 5 g toluene) was transferred to the burst valve of the reactor. The reactor was thermostatted at 40° C. The catalyst solution was pushed into the reactor with ethylene at 1800 kPa, creating the clay-supported catalyst in situ. The polymerization was allowed to proceed isothermally for 30 mins. The reaction yielded 242 g polyethylene with a clay content of 13.2 wt. %.

EXAMPLE 18

0.5 g Acid-treated lithium montmorillonite was partially dehydrated by heating at 100° C. under a dynamic vacuum (12 hours at $\leq 10^{-4}$ Torr) and then transferred to a N$_2$-filled glove box. A solution of the catalyst, tetrabenzylzirconium (140 mg in 2 g toluene) was mixed with a slurry of 2.5 g clay suspended in 80 g toluene for 30 mins at room temperature inside a batch polymerization reactor thermostated at 55° C. The reactor was pressurized with 965 kPa $C_3H_6$ and polymerization was allowed to proceed for 60 mins. The reaction yielded 8.65 g polypropylene with a clay content of 28.9 wt. % and a melting point of 148° C.

EXAMPLE 19

430 mg Acid-treated lithium montmorillonite was partially dehydrated by heating at 100° C. under a dynamic vacuum (12 hours at $\leq 10^{-4}$ Torr) and then transferred to a N$_2$-filled glove box. A solution of the catalyst LNi($\eta^1$-CH$_2$Ph)PMe$_3$ where L=3-(2,6-diisopropylphenylimino)-butan-2-one (16 mg in 2 g toluene) and Ni(COD)$_2$ (37 mg in 1.5 g toluene) were mixed with a slurry of 430 mg clay suspended in 40 g toluene for 30 mins at room temperature. The clay-supported catalyst was allowed to settle and the solvent decanted. 60 g fresh toluene and additional Ni(COD)$_2$ (38 mg in 1.5 g toluene) was then added. The catalyst suspension was then transferred to a batch polymerization reactor and thermostatted at 25° C. The reactor was pressurized with 965 kPa C$_3$H$_6$ and polymerization allowed to proceed for 180 mins. The reaction yielded 1.3 g polypropylene with a clay content of 33.1 wt. %.

REFERENCES

The following publications are hereby incorporated by reference:

[1] T. G. Gopakumar, J. A. Lee, M. Kontopoulou and J. S. Parent, *Influence of clay exfoliation on the physical properties of montmorillonite/polyethylene composites*, Polymer 43 (2002) 5483-5491.

[2] S. S. Ray and M. Okamoto, *Polymer/layered silicate nanocomposites: a review from preparation to processing*, Prog. Polym. Sci. 28 (2003) 1539-1641.

[3] K. Weiss, C. Wirth-Pfeifer, M. Hofmann, S. Botzenhardt, H. Lang, K. Bruning and E. Meichel, *Polymerisation of ethylene or propylene with heterogeneous metallocene catalyst on clay minerals*, J. Mol. Catal. A: Chem. 182/183 (2002) 143-149.

[4] E. G. Howard, R. D. Lipscomb, R. N. MacDonald, B. L. Glazar, C. W. Tullock and J. W. Collette, *Homogeneous Composites of Ultrahigh Molecular Weight Polyethylene and Minerals. 1. Synthesis*, Ind. Eng. Chem. Prod. Res. Dev. 20 (1981) 421-428.

[5] G. G. Hlatky, *Heterogeneous Single-Site Catalysts for Olefin Polymerization*, Chem. Rev. 1000 (2000) 1347-1376.

[6] J. Tudor, L. Willington, D. O'Hare and B. Royan, *Intercalation of catalytically active metal complexes in phyllosilicates and their application as propene polymerisation catalysts*, Chem. Commun. (1996) 2031-2032.

[7] Y. Suga, Y. Maruyama, E. Isobe, T. Suzuki and F. Shimizu, Catalysts for Polymerizing an Olefin and Method for Producing an Olefin Polymer, U.S. Pat. No. 5,308,811 (1994).

[8] Y. Ishihama, E. Isobe, Y. Maruyama, T. Sagae, Y. Suga and Y. Uehara, Catalyst for polymerizing an olefin and method for polymerizing the olefin, EP Patent 0683180 (1995).

[9] T. Sun and J. M. Garces, *High-Performance Polypropylene-clay Nanocomposites by In-situ Polymerization with Metallocene/Clay Catalysts*, Adv. Mater. 14 (2002) 128-130.

[10] J. S. Bergman, H. Chen, E. P. Giannelis, M. G. Thomas and G. W. Coates, *Synthesis and characterization of polyolefin-silicate nanocomposites: a catalyst intercalation and in situ polymerization approach*, Chem. Commun. (1999) 2179-2180.

[11] Y.-H. Jin, H.-J. Park, S.-S. Im, S.-Y. Kwak and S. Kwak, *Polyethylene/Clay Nanocomposite by In-Situ Exfoliation of Montmorillonite During Ziegler-Natta Polymerization of Ethylene*, Macromol. Rapid Commun. 23 (2002) 135-140.

[12] T. Tang, L. Wei and B. Huang, Process for Preparation of Polyolefin/Inorganic Component Nanocomposite by In-situ Polymerization, U.S. Pat. No. 6,649,713 (2003).

[13] J. Heinemann, P. Reichart, R. Thomann and R. Mulhaupt, *Polyolefin nanocomposites formed by melt compounding and transition metal catalyzed ethene homo- and copolymerization in the presence of layered silicates*, Macromol. Rapid Commun. 20 (1999) 423-430.

[14] P. Dubois, M. Alexandre and R. Jerome, *Polymerization-Filled Composites and Nanocomposites by Coordination Catalysis*, Macromol. Symp. 194 (2003) 13-26.

[15] M. Alexandre, P. Dubois, R. Jerome, M. Gareia-Marti, T. Sun, J. M. Garces, D. M. Millar and A. Kuperman, Polyolefin Nanocomposites, Patent WO 99/47598 (1999).

[16] H. G. Jeon, H.-T. Jung, S. W. Lee and S. D. Hudson, *Morphology of polymer/silicate nanocomposites*, Polymer Bull. 41 (1998) 107-113.

[17] A. Usuki, M. Kato, A. Okada and T. Kurauchi, *Synthesis of Polypropylene-Clay Hybrid*, J. Appl. Polym. Sci. 63 (1997) 137-139.

[18] M. Kawasumi, N. Hasegawa, M. Kato, A. Usuki and A. Okada, *Preparation and Mechanical Properties of Polypropylene-Clay Hybrids*, Macromolecules 30 (1997) 6333-6338.

[19] N. Hasegawa, M. Kawasumi, M. Kato, A. Usuki and A. Okada, *Preparation and Mechanical Properties of Polypropylene-Clay Hybrids using a Maleic Anhydride-Modified Polypropylene Oligomer*, J. Appl. Polym. Sci. 67 (1998) 87-92.

[20] D. Kaempfer, R. Thomann and R. Mulhaupt, *Melt compounding of syndiotactic polypropylene nanocomposites containing organophilic layered silicates and in situ formed core/shell nanoparticles*, Polymer 43 (2002) 2909-2916.

[21] P. H. Nam, P. Maiti, M. Okamoto, T. Kotaka, N. Hasegawa and A. Usuki, *A hierarchical structure and properties of intercalated polypropylene/clay nanocomposites*, Polymer 42 (2001) 9633-9640.

[22] K. H. Wang, M. H. Choi, C. M. Koo, Y. S. Choi and I. J. Chung, *Synthesis and characterization of maleated polyethylene/clay nanocomposites*, Polymer 42 (2001) 9819-9826.

[23] N. Hasegawa, M. Okamoto, M. Kawasumi, M. Kato, A. Tsukigase and A. Usuki, *Polyolefin-clay hybrids based on modified polyolefins and organophilic clay*, Macromol. Mater. Eng. 280/281 (2000) 76-79.

[24] E. Manias, A. Touny, L. Wu, K. Strawhecker, B. Lu and T. C. Chung, *Polypropylene/Montmorillonite nanocomposites. Review of the Synthetic routes and Materials Properties*, Chem. Mater. 13 (2001) 3516-3523.

[25] M.-S. Hsiao, G.-Y. Chang, S.-Y. Lee and S.-J. Jong, Polyolefin-Based Nanocomposite and Preparation Thereof, U.S. Pat. No. 6,838,508 (2005).

[26] Z. M. Wang, H. Nakajima, E. Manias and T. C. Chung, Exfoliated PP/Clay *Nanocomposites Using Ammonium-Terminated PP as the Organic Modification for Monmorillonite*, Macromolecules 36 (2003) 8919-8922.

[27] S.-S. Hou and K. Schmidt-Rohr, *Polymer-Clay Nanocomposites from Directly Micellized Polymer/Toluene in Water and Their Characterization by WAXD and Solid-State NMR Spectroscopy*, Chem. Mater. 15 (2003) 1938-1940.

[28] T. Sun, J. M. Garces and Z. R. Jovanovic, *Nanocomposite Polymers*, International Patent Application Publication No. WO 01/30864 (2001).

[29] B. Y. Lee, G. C. Bazan, J. Vela, Z. J. A. Komon and X. Bu, α-*Iminocarboxamidato-Nickel (II) Ethylene Polymerization Catalysts*, J. Am. Chem. Soc. 123 (2001) 5323-5353.

The invention claimed is:

1. A method for forming a nanocomposite polymer by olefin polymerization, comprising:
    disrupting the layered structure of at least one cation-exchanging layered filler, selected from the group consisting of cation-exchanging, layered inorganic silicates and cation exchanging, layered compounds other than silicates, combining said disrupted filler with an activatable catalyst that becomes activated for olefin polymerization when in contact with the filler; and contacting an olefin with the activated catalyst—filler combination either (a) in the absence of an alkylaluminum co-catalyst or (b) with an alkylaluminum co-catalyst when the activatable catalyst is a polyalkylmetal compound, whereby to form an exfoliated clay-polyolefin nanocomposite incorporating platelets of said treated filler.

2. The method of claim 1 in which said filler is clay.

3. The method of claim 1 in which said filler is treated by acid whereby to partly disrupt its layered structure.

4. The method of claim 1 in which said clay is montmorillonite.

5. The method of claim 1 in which said olefin is ethylene.

6. The method of claim 1 in which said olefin is propylene.

7. The method of claim 1 in which said olefin is a combination of ethylene and an α-olefin.

8. The method of claim 7 in which said α-olefin is 1-hexene.

9. The method of claim 1 in which sufficient filler is used to constitute greater than 0.5 weight % of the nanocomposite.

10. The method of claim 1 in which sufficient filler is used to constitute at least 30 weight % of the nanocomposite to prepare a high clay-loaded exfoliated nanocomposite masterbatch incorporating platelets of said load material.

11. The method of claim 10 including the step of blending a predetermined amount of one or more olefinic polymers with said masterbatch to obtain a nanocomposite having a desired amount of loading.

12. The method of claim 1 in which said catalyst is a non-metallocene catalyst.

13. The method of claim 12 in which said catalyst is a nickel complex bearing an α-iminocarboxamidato ligand.

14. The method of claim 12 in which said catalyst has the general formula I, II, III, or IV:

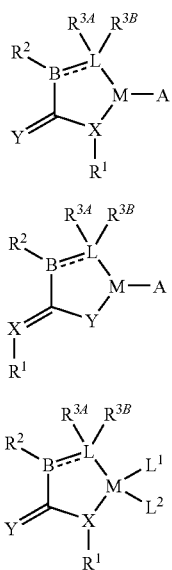

(I)

(II)

(III)

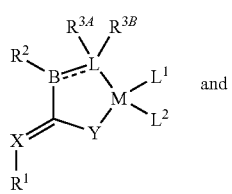

(IV)

wherein:

M is Ni, Pt, Pd;

A is a π-allyl, a substituted π-allyl, a π-benzyl, a substituted π-benzyl, benzoyl or picolino ligand;

X is N, P or CH;

Y is O, $CH_2$, or S;

L is N or P or a structure that is capable of being a neutral two electron donor ligand;

$L^1$ is a neutral monodentate ligand and $L^2$ is a monoanionic monodentate ligand, or $L^1$ and $L^2$ taken together are a monoanionic bidentate ligand, provided that said monoanionic monodentate ligand or said monoanionic bidentate ligand is capable of adding to said olefin;

B is a bridge connecting covalently an unsaturated carbon and L;

$R^1$, $R^2$, $R^{3A}$ and $R^{3B}$ are the same or different and are each independently hydrogen, hydrocarbyl group, or substituted hydrocarbyl bearing functional group;

the designation:$=\!=\!=$ is a single or double bond; and $R^{3B}$ is nothing when B is connected to L by a double bond.

15. The method of claim 13 in which said α-iminocarboxamidato catalyst is (N-(2,6-diisopropylphenyl)-2-(2,6-diisopropylphenylimino)propanamidato)Ni($\eta^3$-$CH_2Ph$).

16. The method of claim 12 in which said activatable catalyst is a polyalkylmetal compound.

17. The method of claim 16 in which said activatable catalyst has the formula MRx where M is an early transitional metal, R is an alkyl or substituted alkyl ligand, and x is from 3 to 6.

18. The method of claim 17 in which the metal component is selected from titanium, zirconium, hafnium, vanadium, niobium, tantalum, chromium, molybdenum, and tungsten, the alkyl or substituted alky ligand lacks an alpha-hydrogen, and x is 4.

19. The method of claim 18 in which the alkyl or substituted alkyl ligand is selected from neopentyl, neosilyl, benzyl, and adamantyl groups.

20. The method of claim 17 in which said activatable catalyst is tetrabenzylzirconium.

21. The method of claim 12 in which said olefin is ethylene.

22. The method of claim 12 in which said olefin is propylene.

23. The method of claim 12 in which said olefin is a combination of ethylene and an α-olefin.

24. The method of claim 23 in which said α-olefin is 1-hexene.

25. A polymer prepared by the method of claim 1.

* * * * *